(12) United States Patent
Ham et al.

(10) Patent No.: US 10,345,133 B2
(45) Date of Patent: Jul. 9, 2019

(54) FIXED QUANTITY DISCHARGE DEVICE FOR LIQUID CONTAINER

(71) Applicant: YONWOO CO., LTD., Incheon (KR)

(72) Inventors: Ki-Young Ham, Incheon (KR); Seo-Hui Jung, Incheon (KR)

(73) Assignee: YONWOO CO., LTD., Incheon (KR)

( * ) Notice: Subject to any disclaimer, the term of this patent is extended or adjusted under 35 U.S.C. 154(b) by 55 days.

(21) Appl. No.: 15/311,847

(22) PCT Filed: Apr. 23, 2015

(86) PCT No.: PCT/KR2015/004041
§ 371 (c)(1),
(2) Date: Nov. 16, 2016

(87) PCT Pub. No.: WO2015/178592
PCT Pub. Date: Nov. 26, 2015

(65) Prior Publication Data
US 2017/0082475 A1    Mar. 23, 2017

(30) Foreign Application Priority Data

May 20, 2014  (KR) .......................... 10-2014-0060180

(51) Int. Cl.
*G01F 11/02* (2006.01)
*B05B 11/00* (2006.01)
(Continued)

(52) U.S. Cl.
CPC ............ *G01F 11/028* (2013.01); *B05B 11/02* (2013.01); *B05B 11/3042* (2013.01);
(Continued)

(58) Field of Classification Search
CPC . B05B 11/3042; B05B 11/02; B05B 11/0048; B05B 11/3052; B65D 47/00;
(Continued)

(56) References Cited

U.S. PATENT DOCUMENTS 4,362,063 A * 12/1982 Marteau d'Autry .... B01L 3/022
422/924
4,501,163 A *  2/1985 MacDermott ......... B01L 3/0224
422/925
(Continued)

FOREIGN PATENT DOCUMENTS

CN     104544906 A     4/2015
CN     105246372 A     1/2016
(Continued)

OTHER PUBLICATIONS

Office Action issued in Chinese Patent Application No. 201580025172.7 dated May 29, 2018.
(Continued)

*Primary Examiner* — Paul R Durand
*Assistant Examiner* — Randall A Gruby
(74) *Attorney, Agent, or Firm* — Marshall, Gerstein & Borun LLP (57) ABSTRACT

The present invention relates to a fixed quantity discharge device for a liquid container that includes a spuit pipe formed so as to suck contents without being exposed to the contents stored in a container body such that contamination of the spuit pipe due to the contents can be prevented; and a piston rising according to a use of the contents within the container body so as to minimize the remaining contents within the container body.

8 Claims, 8 Drawing Sheets

(51) Int. Cl.
  *B05B 11/02* (2006.01)
  *B65D 47/00* (2006.01)
(52) U.S. Cl.
  CPC ........ *B65D 47/00* (2013.01); *A45D 2200/055* (2013.01); *A45D 2200/056* (2013.01); *B05B 11/00416* (2018.08); *B05B 11/3052* (2013.01)
(58) Field of Classification Search
  CPC ......... B65D 25/04; G01F 11/028; A45C 5/14; A45D 2200/055; A45D 2200/056
  See application file for complete search history.

(56) References Cited

U.S. PATENT DOCUMENTS

| | | | | |
|---|---|---|---|---|
| 5,320,810 | A * | 6/1994 | Al-Mahareeq | B01L 3/0224 422/517 |
| 6,250,154 | B1 * | 6/2001 | Cheresko | G01F 11/025 73/426 |
| 6,923,938 | B2 * | 8/2005 | Cote | B01L 3/0224 422/525 |
| 6,966,465 | B2 * | 11/2005 | Kang | B05B 11/3001 222/321.9 |
| 7,874,461 | B2 * | 1/2011 | Bae | B05B 11/0032 222/153.11 |
| 8,152,026 | B2 * | 4/2012 | Ki | A45D 34/04 222/153.13 |
| 9,234,781 | B2 * | 1/2016 | Lee | B65D 41/56 |
| 9,675,160 | B2 * | 6/2017 | Jung | A45D 34/00 |
| 9,931,628 | B2 * | 4/2018 | LaCroix | B01L 3/0224 |
| 2011/0284123 | A1 * | 11/2011 | Bouix | A45D 34/04 141/23 |
| 2012/0261029 | A1 * | 10/2012 | Kim | A45D 34/04 141/23 |
| 2013/0074983 | A1 * | 3/2013 | Choi | A45D 34/04 141/23 |
| 2013/0112314 | A1 * | 5/2013 | Lee | A45D 34/04 141/23 |
| 2013/0192713 | A1 * | 8/2013 | Drugeon | A45D 34/04 141/26 |
| 2014/0020789 | A1 * | 1/2014 | Duquet | A45D 34/04 141/24 |
| 2014/0234007 | A1 * | 8/2014 | Lee | A45D 34/00 401/121 |
| 2014/0361047 | A1 * | 12/2014 | Lee | G01F 11/028 222/372 |
| 2015/0144663 | A1 * | 5/2015 | Noel | A45D 34/00 222/383.1 |
| 2015/0257510 | A1 * | 9/2015 | Kim | A45D 34/041 401/126 |
| 2015/0320175 | A1 * | 11/2015 | Lee | A45D 34/00 222/372 |
| 2016/0058154 | A1 * | 3/2016 | Jung | A45D 34/00 222/382 |
| 2016/0324294 | A1 * | 11/2016 | Kim | A45D 34/04 |
| 2017/0000236 | A1 * | 1/2017 | Jung | B05B 15/20 |

FOREIGN PATENT DOCUMENTS

| | | |
|---|---|---|
| EP | 2829194 A1 | 1/2015 |
| EP | 2904928 A1 | 8/2015 |
| EP | 3000349 A1 | 3/2016 |
| FR | 2922534 A1 | 4/2009 |
| JP | 2010-105712 A | 5/2010 |
| JP | 2013-249110 A | 12/2013 |
| KR | 20130060742 A | 6/2013 |
| KR | 20130062124 A | 6/2013 |
| KR | 20140043994 A | 4/2014 |
| WO | WO-2009/119957 A1 | 10/2009 |
| WO | WO-2012/161408 A1 | 11/2012 |
| WO | WO-2013/141485 A1 | 9/2013 |

OTHER PUBLICATIONS

Extended European Search Report issued in European Patent Application No. 15795820 dated Feb. 27, 2018.
Notice of Reasons of Refusal issued in Japanese Patent Application No. 2016-568399 dated Feb. 26, 2019.

* cited by examiner

FIXED QUANTITY DISCHARGE DEVICE FOR LIQUID CONTAINER

BACKGROUND OF THE INVENTION

The present invention disclosed herein relates to a fixed quantity discharge device for a liquid container, particularly the fixed quantity discharge device for a liquid container wherein a spuit pipe is configured to suck contents stored in a container body without being exposed to the contents, such that it is possible to prevent the spuit pipe from being contaminated and also to make the residual contents remaining in the container body minimized due to a piston which ascends according to a use of contents within the container body.

Generally, a method used for cosmetics or liquid contents such as an eye cream is used by applying a small but fixed quantity at a time. Therefore, a method individually prepacking a fixed quantity for each use was used by packing as much as to be used in one container such as a capsule. However, this individual packing method had a problem in that there remained relatively large quantity of residual in the capsule, which was very inefficient.

To solve this problem in individual prepacking method, a structure is devised to use a discharging tool, which has an ordinary spuit or an injector to suck and discharge contents contained in a container or a discharging tool having a structure of a push pump, and thereby the contents are withdrawn when it is used.

However, in case of a discharging tool with a structure of ordinary spuits, the amount of discharged contents is variable according to the amount of pressure given by a user; therefore, it is not easy to discharge a fixed quantity each time.

To solve such problems described in the above, "Dispenser for liquid container" (Korean registered patent no. 10119176) has been filed by the inventor of this application, which proposes a structure that can discharge a fixed quantity of contents.

The above registered patent has a configuration wherein a spring (800) contracts when an inner cap (220) is coupled to a container body (100), and then the spring (800) restores and thereby contents can flow into the interior of the spuit pipe (700) when the inner cap (220) is detached. Therefore, it is possible to discharge a fixed quantity of contents easily with no additional manipulation.

However, the register patent has a structure wherein the entire part of a spuit pipe (700) is inserted into the inside the container body and then withdrawn. Therefore, there arise problems wherein the spuit pipe (700) is contaminated by the contents stored in the container body (100), and also a large quantity of residual contents remains therein due to the structure wherein it is difficult to suck the contents remaining on the wall of the container body (100).

In addition, since it has a structure wherein a button part (400) is restored by a spring (800) after contents being used, the structure should be very complicated so as to suck contents back into the inside of the spuit pipe (700) after contents are used. Namely, it is necessary to combine an inner cap (200) and move a button part (400) to a downward direction and then move the button part (400) to an upward direction when detaching the inner cap (200).

SUMMARY OF THE INVENTION

The present invention is devised to solve the said problems above, and its goal is to provide a fixed quantity discharge device for a liquid container, wherein a spuit pipe is configured to suck contents stored in a container body without being exposed to the contents, such that the spuit pipe is prevented from being contaminated by the contents and also make the residual contents remaining in the container body minimized due to a piston which ascends according to a use of contents in the container body.

In addition, it is to provide a dispenser for a liquid container, wherein by installing a check valve which opens/closes a content inflow hole at an inner lower portion of a content suction tube, it is possible not only to prevent the contents from moving into the container body when pressing a button part in a state of the contents being sucked into a spuit pipe without separating an inner cap, but also to prevent air inflow into the container body when separating a spuit part.

Furthermore, it is to provide a fixed quantity discharge device for a liquid container which can suck contents by means of a simple configuration without a spring equipped by designing a structure wherein a button part ascends along a guide part equipped at an inner cap when a spuit part is coupled to a coupling part.

To solve such problems described in the above, a fixed quantity discharge device for a liquid container includes a container body storing contents; and a spuit part which is coupled so as to be detached from the container body; and a spuit pipe which sucks and discharges contents stored in the container body.

The fixed quantity discharge device for a liquid container further includes: a support body which is coupled to an upper portion of the container body, comprising a coupling part where the spuit part is coupled, and further comprising a spuit pipe receiving tube which forms a hollow such that the spuit pipe receiving tube can extend from the coupling part to an interior of the container body and the spuit pipe can be inserted and withdrawn; a content suction part which is coupled to a lower portion of the support body, and forms a content inflow hole such that contents stored in the container body can flow in; a check valve which is provided at an inner side of the content suction part and opens/closes the content inflow hole; and a piston which moves according to a use of the contents inside the container body.

The spuit part is featured to suck contents in a state that the spuit pipe is not exposed to the contents stored in the container body.

Furthermore, the spuit part is featured to include a sealing member which is installed in a close contact with an inner circumferential surface of the content suction part and guides the contents moving through the content inflow hole to move exclusively to the spuit pipe when the check valve opens.

Furthermore, the spuit part is featured to include: a spuit pipe sucking the contents which are received in the spuit pipe receiving tube and then flow into a content suction part through the content inflow hole; an inner cap which is screw-coupled to the coupling part, and comprises a guide part which ascends/descends a button part at both upper ends thereof; an outer cap which is coupled encasing the inner cap and is rotated with the inner cap by user's manipulation, comprising a vertical guide groove longitudinally at an inner circumferential surface so as to guide the vertical movement of a button part; and a button part which is ascended by rotation of the outer cap and then descended by user's pressurization, comprising a guide protrusion which ascends/descends along the guide part of the inner cap.

Furthermore, a fixed quantity discharge device for a liquid container includes a content body containing contents and a spuit part coupled detachably from the container body and comprising a spuit pipe that sucks/discharges a fixed quantity of contents stored in the container body, further comprising: a support body coupled to an upper portion of the container body, forming a coupling part where the spuit part is coupled, and extended from the coupling part into an interior of the container body such that the spuit pipe can be inserted and withdrawn, wherein a content suction tube forming a content inflow hole is provided at a lower end of an inner side thereof; a check valve which is installed at an inner side of the content suction tube and opens/closes the content inflow hole; and a piston which moves according to the use of the contents inside the container body, wherein the spuit part is featured to suck the contents in a state that the spuit pipe is not exposed to the contents stored in the container body.

Furthermore, the spuit part further includes a sealing member which is installed in a close contact with an inner circumferential surface of the content suction part and guides the contents moving through the content inflow hole to move exclusively to the spuit pipe when the check valve opens.

Furthermore, the spuit part is featured to include: a spuit pipe suction contents which is received in the content suction tube and flows into a content suction tube through the content inflow hole; an inner cap which is screw-coupled to the coupling part, and comprises a guide part which ascends/descends a button part at both upper ends thereof; an outer cap which is coupled encasing the inner cap and is rotated with the inner cap by user's manipulation, comprising a vertical guide groove longitudinally at an inner circumferential surface so as to guide the vertical movement of a button part; and a button part which is ascended by rotation of the outer cap and then descended by user's pressurization, comprising a guide protrusion which ascends/descends along the guide part of the inner cap.

Furthermore, it is featured that at a center of the inner cap is installed a pipe fixing part which is inserted to an upper portion of the spuit pipe and fixes the spuit pipe to the inner cap.

Furthermore, it is featured that the guide part is configured to include an ascending guide face which forms a slope in order to guide an ascent of a guide protrusion; a descending guide face which forms a slope so as to be corresponded with the ascending guide face and guides a descent of the guide protrusion; and a securing face which is disposed between the ascending guide face and the descending guide face and at which the guide protrusion arrives safely as the guide protrusion is descending.

Furthermore, it is featured that at an end of the ascending guide face is formed a limiting protrusion which extends horizontally, thus supporting the guide protrusion and limiting the downward movement of a button part.

Furthermore, it is featured that a flange tip support rod formed protrusively in a downward direction is equipped at a center of the inner upper end of the button part, and that at the flange tip support rod is equipped a flange tip which moves upward and downward inside a spuit pipe and sucks and discharges contents according to the pressure change inside the spuit pipe.

Furthermore, it is featured that the check valve prevents the contents sucked into the spuit pipe from moving to the container body in a state that the spuit part is coupled to the coupling part, and blocks the air inflow to the container body when the spuit part is separated from the coupling part.

Furthermore, it is featured that at an upper end of the sealing member is provided an insertion hole such that the spuit pipe can be inserted and withdrawn, and at a lower end thereof is provided a content moving hole such that the contents flowing in through the content inflow hole can move to the spuit pipe.

As described above, according to the present invention, a spuit pipe is configured to suck the contents stored in a container body without being exposed to contents, such that it is possible to prevent the spuit pipe from being contaminated and also to make the residual contents remaining in the container body minimized due to a piston which ascends according to the use of contents in the container body.

In addition, by equipping a check valve which opens/closes a content inflow hole at an inner lower portion of the content suction tube, it is possible that the check valve prevents the contents from moving to an interior of the container body when a button part is pressurized without separating an inner cap in a state that the contents are sucked in a spuit pipe, and also blocks the air inflow to the container body when the spuit part is separated.

In addition, by designing a structure wherein a button part ascends along a guide part formed at an inner cap, and the contents stored in the container body is sucked into the spuit pipe when a spuit part is coupled to a coupling part, it is possible to suck the contents without a structure of a spring equipped.

DETAILED DESCRIPTION OF PREFERRED EMBODIMENTS

Hereinafter, exemplary embodiments of the present invention will be described in detail with reference to the accompanying drawings. The same reference numerals provided in the drawings indicate the same members.

Figure 1:
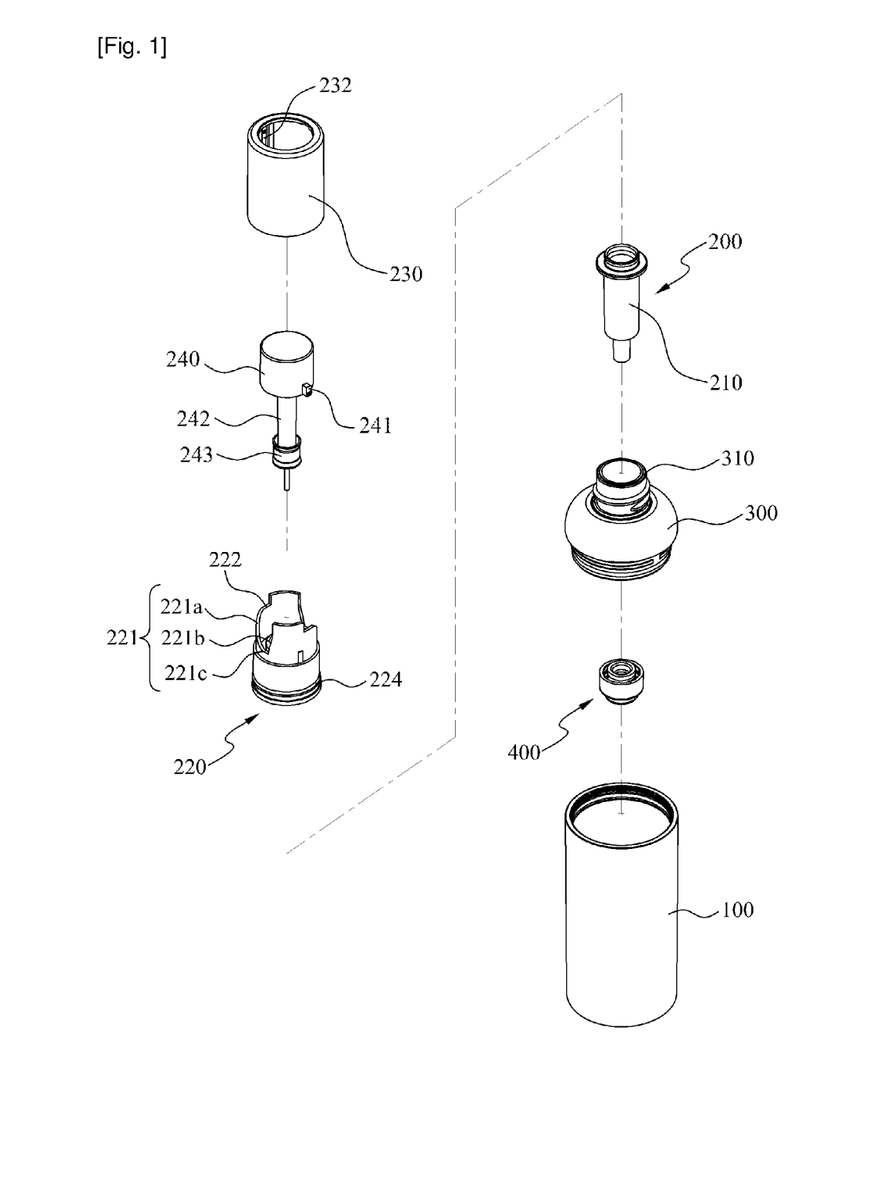
FIG. 1 is an exploded perspective view illustrating a configuration of a fixed quantity discharge device for a liquid container according to an exemplary embodiment of the present invention.
Figure 2:
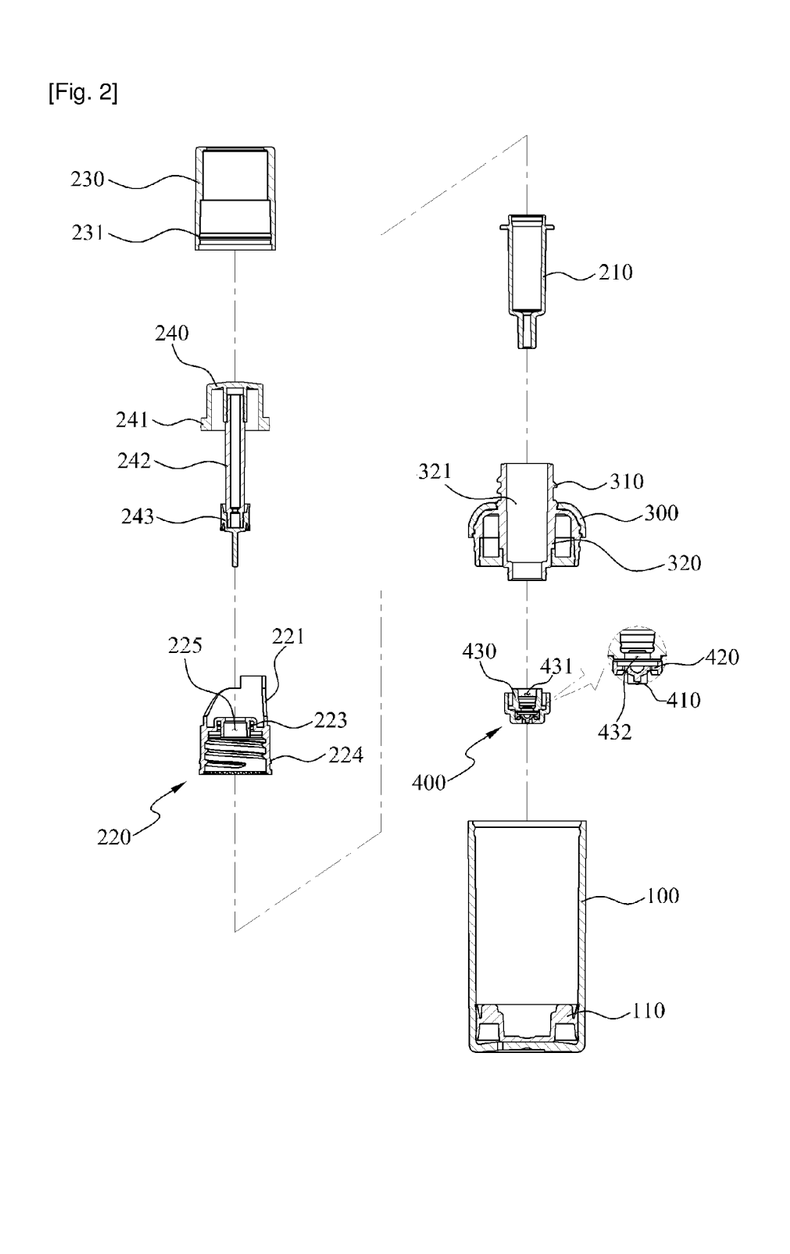
FIG. 2 is an exploded cross-sectional view illustrating a configuration of a fixed quantity discharge device for a liquid container according to an exemplary embodiment of the present invention.

FIG. 1 is an exploded perspective view illustrating a configuration of a fixed quantity discharge device for a liquid container according to an exemplary embodiment of the present invention. FIG. 2 is an exploded cross-sectional view illustrating a configuration of a fixed quantity discharge device for a liquid container according to an exemplary embodiment of the present invention.

Figure 3:
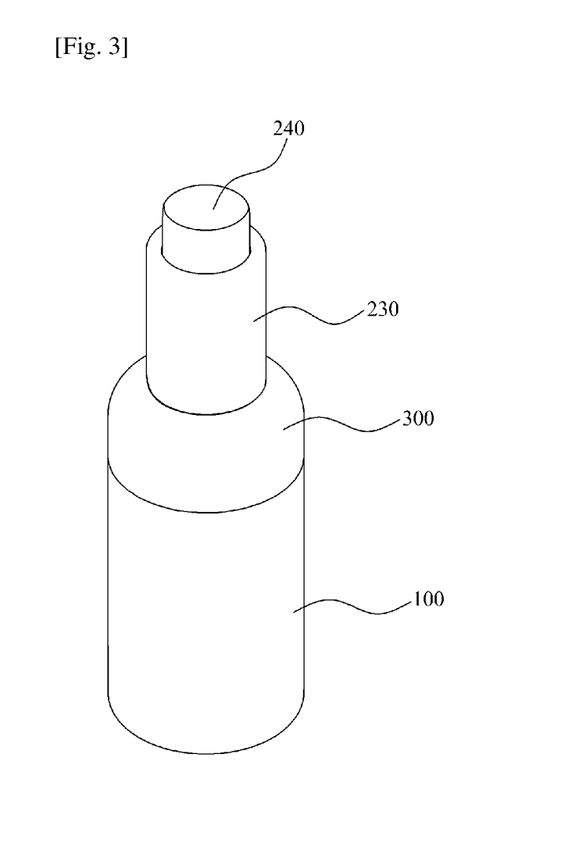
FIG. 3 is an assembled perspective view illustrating a configuration of a fixed quantity discharge device for a liquid container according to an exemplary embodiment of the present invention.
Figure 4:
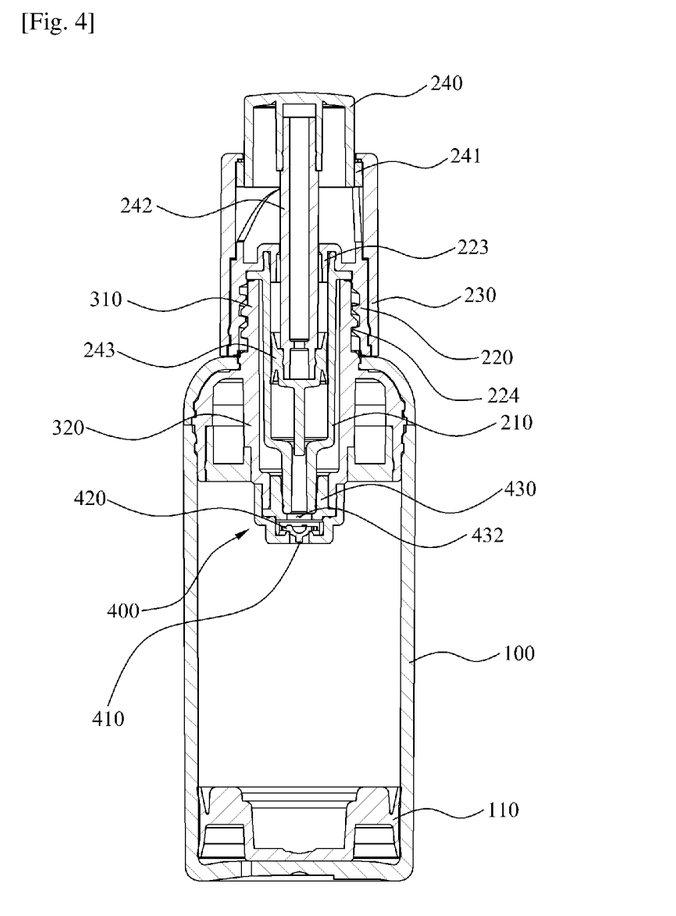
FIG. 4 is an assembled cross-sectional view illustrating a configuration of a fixed quantity discharge device for a liquid container according to an exemplary embodiment of the present invention.
Figure 5:
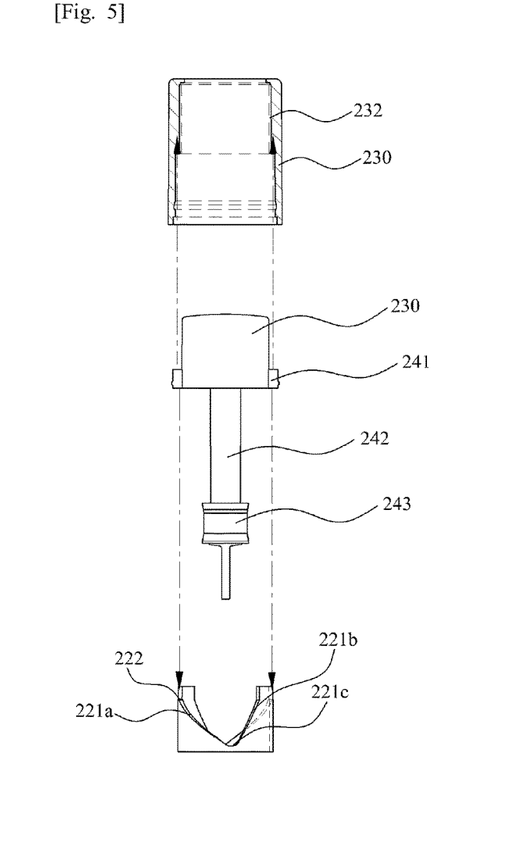
FIG. 5 is an explanatory view illustrating a combining state of an inner cap, a button part, and an outer cap of the fixed quantity discharge device for a liquid container according to an exemplary embodiment of the present invention.
Figures 6A, 6B, 6C:
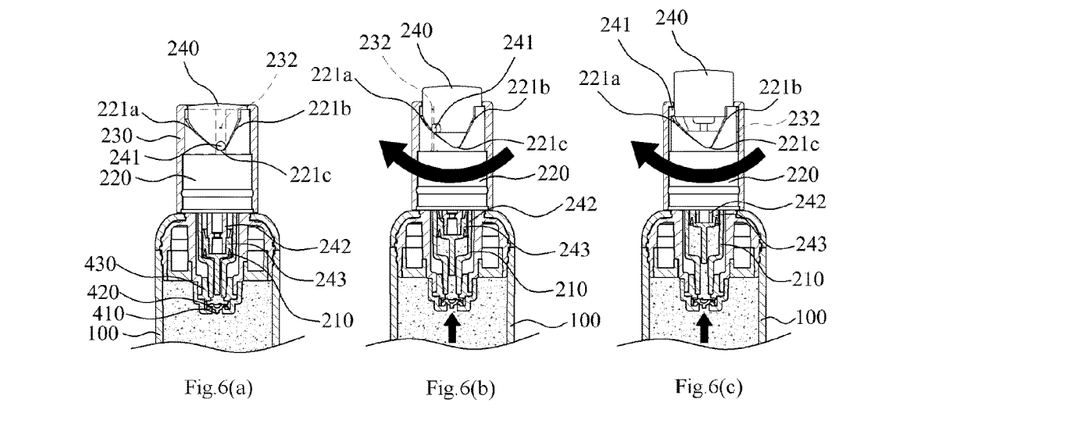
FIGS. 6(a) to 6(c) and FIGS. 7(a) to 7(c) are explanatory views illustrating a content-sucking process of a spuit part of a fixed quantity discharge device for a liquid container according to an exemplary embodiment of the present invention.
Figure 7A:
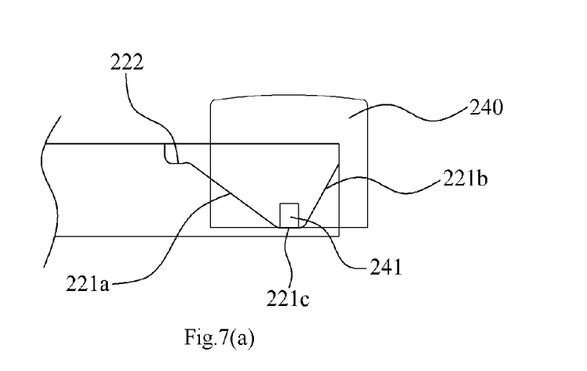
Figure 7B:
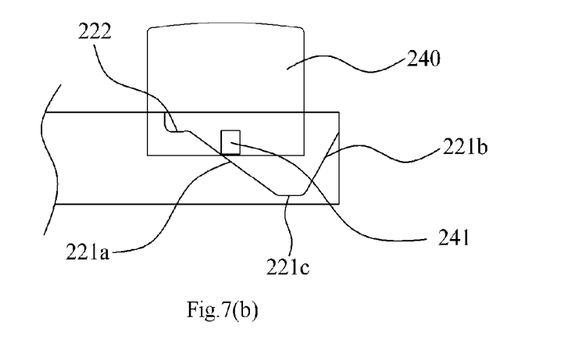
Figure 7C:
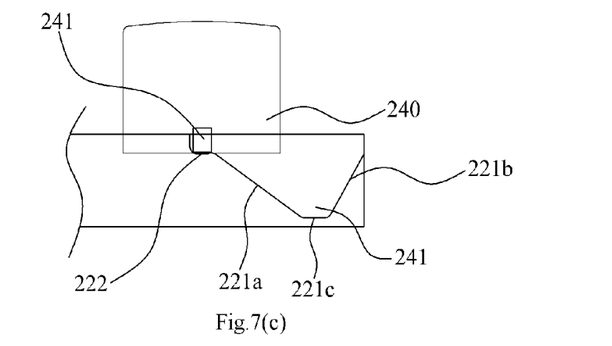
Figure 8A:
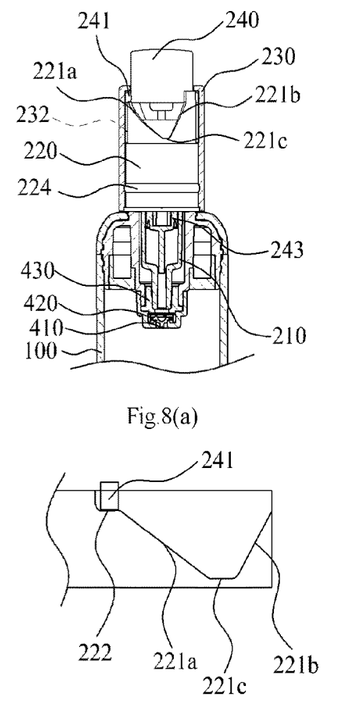
FIGS. 8(a) to 8(b) and FIGS. 9(a) to 9(c) are explanatory views illustrating a discharging process of contents through a spuit part of a fixed quantity discharge device for a liquid container according to an exemplary embodiment of the present invention.
Figure 8B:
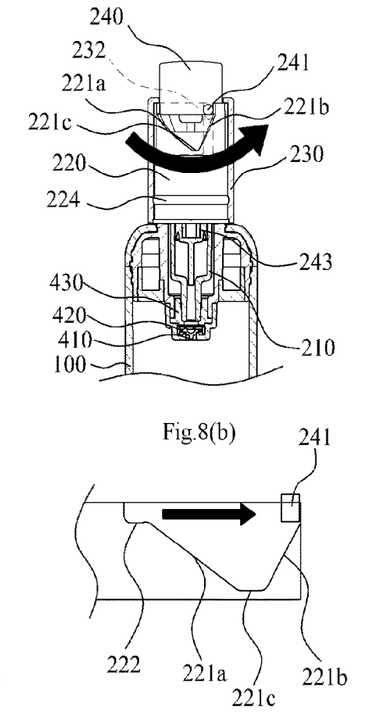
Figure 9A:
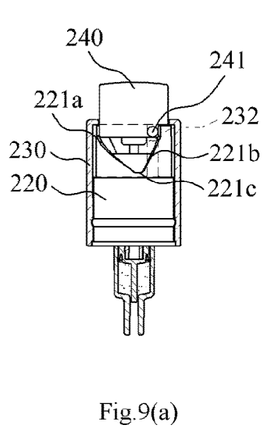
Figure 9B:
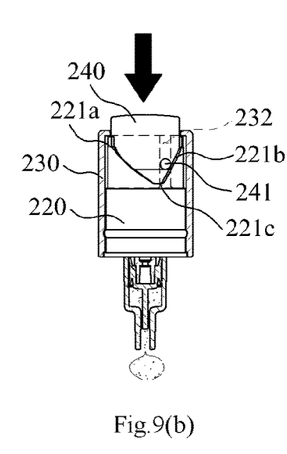
Figure 9C:
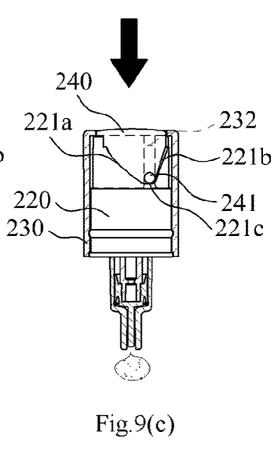

FIG. 3 is an assembled perspective view illustrating a configuration of a fixed quantity discharge device for a liquid container according to an exemplary embodiment of the present invention. FIG. 4 is an assembled cross-sectional view illustrating a configuration of a fixed quantity discharge device for a liquid container according to an exemplary embodiment of the present invention. FIG. 5 is an explanatory view illustrating a combining state of an inner cap, a button part, and an outer cap of a fixed quantity discharge device for a liquid container according to an exemplary embodiment of the present invention.

Referring to FIGS. 1 to 5, a fixed quantity discharge device for a liquid container according to an exemplary embodiment of the present invention includes a container body 100, a spuit part 200, a support part 300, and a content suction part 400.

The container body 100 where contents are contained comprises a piston 110 which ascends according to a contents use at an inner side thereof. In the present invention, by providing a piston 110 at an interior of the container body 100, it is possible to minimize the residual contents remaining at an inner wall of the container body 100 when the contents are withdrawn through a spuit part 200 to be used.

The spuit part 200 combined so as to be detached from the container body 100 and sucking and discharging a fixed amount of contents contained in the container body 100, includes a spuit pipe 210, an inner cap 220, an outer cap 230, and a button part 240.

The spuit pipe 210, forming a lower open end thereof and sucking the contents flowing into a contents suction part 400 to be described later, is inserted into the contents suction part 400 when a spuit part 200 is coupled to a coupling part 310, and sucks and then stores the contents flowing into the contents suction part 400 through a content inflow hole 410. The spuit pipe 210 is withdrawn from a spuit pipe receiving tube 320 and thereby discharges the contents stored in to the outside when the spuit part 200 is separated from the coupling part 310 by pressurization of a button part 240.

In the present invention, a lower portion of the spuit pipe 210 is configured to be coupled to an insertion hole 431 of a sealing member 430 disposed at an inner lower end of a content suction part 400 when being inserted to a spuit pipe receiving tube 320. In the process of coupling thereof, an outer circumferential surface of the spuit pipe 210 is closely contacted to the sealing member 430, such that the contents flowing in through the content inflow hole 410 can flow exclusively to an opened lower end of the spuit pipe 210.

It is possible that the spuit pipe 210 sucks contents in a state that the spuit pipe 210 is not exposed to the contents stored in the container body by the spuit pipe receiving tube 320 and the content suction part 400. Due to this, it is possible that the spuit pipe 210 is prevented from being contaminated, which is different from conventional ones wherein a spuit pipe sucks contents while being immersed in the contents and thereby an outer circumferential surface of the spuit pipe is smeared and contaminated with the contents.

The inner cap 220 is screw-coupled to a coupling part 310 of the support body 300, and in the present invention, is characterized to comprise a guide part 221 which ascends/descends the button part 240 at both sides of an upper end of the inner cap 220.

The guide part 221 comprises an ascending guide face 221a which forms a slanted face so as to guide the ascent of a guide protrusion to be described later; a descending guide face 221b which guides the descent of the guide protrusion 241 by forming a slanted face so as to be corresponded with the ascending guide face 221a; and a securing face 221c which is disposed between the ascending guide face 221a and the descending guide face 221b and wherein the guide protrusion 241 is secured in a state of being descended.

The guide part 221 ascends the button part 240 by guiding the guide protrusion 241 to move in an upward direction along the ascending guide face 221a when an outer cap 230 is rotated to one side direction, and comprises a limiting protrusion 222 which extends horizontally and supports the guide protrusion 241, thereby limiting the downward movement thereof in a state of the button part 240 being ascended.

Furthermore, the guide part 221, while the guide protrusion 241 is being located at an upper portion of the descending guide face 221b, guides the guide protrusion 241 to move in a downward direction along the descending guide face 221b and thereby descends the button part 240 when the button part 240 is pressurized by a user.

On the other hand, a coupling protrusion 224, which is coupled to a coupling groove 231 of an outer cap 230 as encasing an outer circumferential surface, is installed at a lower portion of the inner cap 220.

On the other hand, at the center of the inner cap 220 is installed a pipe fixing part 223 which fixes a spuit pipe 210 to an inner cap 220, wherein the pipe fixing part 223 is coupled encasing an upper portion of the spuit pipe 210 and prevents the spuit pipe 210 from being detached from the inner cap 220, in a state that a spuit part 200 is being detached from the coupling part 310 of the support body 300. A penetrating hole 225 is formed at a center portion of a pipe fixing part 223 such that a flange tip supporting rod 242 can be penetrated in.

The outer cap 230 is coupled encasing the inner cap 220 and is rotated along with the inner cap 220 by the manipulation of a user, and comprises a vertical guide groove 232 longitudinally at an inner circumferential surface so as to guide the vertical movement of the button part 240.

a guide protrusion 241 of the button part 240 is coupled at the vertical guide groove 232, and guides the guide protrusion 241 of the button part 240 to move vertically when an outer cap 230 is rotated.

On the other hand, at a lower portion of the outer cap 230 is installed a coupling groove 231 which is coupled with the coupling protrusion 224.

The button part 240, which ascends along an ascending guide face 221a by rotation of the outer cap 230 and then descends along a descending guide face 221b, comprises at a side surface thereof a guide protrusion 241 which moves along a guide part 221 of the inner cap 220.

The button part 240 discharges contents sucked in the interior of a spuit pipe 210 to the outside by a user's pressurization. For this, at a center of the inner upper end of the button part 240 is installed a flange tip support rod 242 where a flange tip 243 is coupled protrusively in a downward direction.

At a lower portion of the flange tip support rod 242 is coupled a flange tip 243, such that when a user presses an upper end of the button part 240, the flange tip 243 moves in a downward direction in the interior of a spuit pipe 210 by the flange tip support rod 242 and changes the pressure of the interior of the spuit pipe 210, thereby discharging the contents sucked in the interior of the spuit pipe 210.

On the other hand, when the button part 240 is ascended by rotation of an outer cap 230, the pressure in the interior of the spuit pipe 210 is changed by the upward movement of the flange tip support rod 242 and the flange tip 243, thereby sucking the contents contained in the container body 100 into the interior of the spuit pipe 210.

The support body 300 is coupled to an upper portion of the container body 100, and comprises a coupling part 310 screw-coupled with the inner cap 220 such that the spuit part 200 is coupled to an upper portion thereof. The support body 300 further comprises at a lower portion of the coupling part 310 a spuit pipe receiving tube 320 which extends from the coupling part 310 into the interior of the container body 100 and forms a hollow 321 such that the spuit pipe 210 can be inserted/withdrawn therein.

The spuit pipe receiving tube 320, by pressurizing an upper end of a sealing member 430 installed at a content suction part 400 and preventing the sealing member 430 from moving to an upper portion thereof, prevents a sealing member 430 from being separated from the content suction part 400.

The content suction part 400 is coupled to a lower portion of the support body 300 and sucks the contents stored in the container body 100, comprising a content inflow hole 410 at a lower end thereof such that the contents can flow in when the contents stored in the container body 100 is sucked by means of the spuit part 200.

In the present invention, it is featured that at a lower portion of the content suction part 400 is installed a check valve 420 which opens/closes the content inflow hole 410 according to the change of the pressure in the spuit pipe 210 caused by the movement of the flange tip 243, wherein the check valve 420 is disposed in a state of the content inflow hole 410 being closed when the button part 240 descends, and then opens the content inflow hole 410 so as to suck the contents into the interior of the spuit pipe 210.

The check valve 420 prevents the contents sucked in the spuit pipe 210 from moving to the container body 100 when the button part 240 is unintentionally pressurized by a user in a state that the spuit part 200 is coupled to the coupling part 310. In addition, when the spuit part 200 is separated from the coupling part 310, the check valve 420 blocks air inflow to the container body 100, and thereby prevents the contents from being spoiled.

Meanwhile, in the present invention, it is characterized that a sealing member 430, which guides the contents flowing in through the content inflow hole 410 to move exclusively to a spuit pipe 210, is installed at an inner lower end of the content suction part 400, wherein the sealing member 430 is installed in a state of being contacted tightly to an inner circumferential surface of the spuit pipe receiving tube 320, and is coupled as encasing a lower portion of the spuit pipe 210 when the spuit part 200 is coupled to the coupling part 310, thereby preventing the contents from being discharged to any other place except the spuit pipe 210.

The sealing member 430 equips an insertion hole 431 at an upper end thereof such that a spuit pipe 210 can be inserted/withdrawn when a spuit part 200 is coupled to the coupling part 310, and comprises a content moving hole 432 at a lower end thereof such that the contents flowing in through the content inflow hole can be moved to the spuit pipe 210.

Hereinafter, referring FIGS. 6(a) through 9(c), a using method of a fixed quantity discharge device for a liquid container will be explained. FIGS. 6(a) through 9(c), are explanatory views illustrating a contents suctioning process of a spuit part of a fixed quantity discharge device for a liquid container according to an exemplary embodiment of the present invention. FIGS. 8(a) through 9(c), are explanatory views illustrating a discharging process of contents through a spuit part of a fixed quantity discharge device for a liquid container according to an exemplary embodiment of the present invention.

FIGS. 6(a) through 9(c), illustrate a using method of a fixed quantity discharge device for a liquid container according to an exemplary embodiment of the present invention, wherein when a user rotates an outer cap 230 to one side direction in a state that a guide protrusion 241 of a button part 240 is secured at a securing face 221c, an inner cap 220 is rotated simultaneously by the pressure which is applied to the outer cap 230. Due to this, the inner cap 220 gets screw-coupled to the coupling part 310 of a support body 300.

When the inner cap 220 completes screw-coupling to the coupling part 310, the inner cap 220 does not rotate anymore; instead the outer cap 230 rotates independently. At this time, a guide protrusion 241 of the button part 240 ascends along an ascending guide face 221a, and thus the button part 240 ascends.

Next, when the button part 240 ascends, a flange tip 243 coupled to a lower portion of a flange tip supporting rod 242 of the button part 240 ascends. Next, as the flange tip 243 ascends, a check valve 420 opens a content inflow hole 410, which causes contents to flow into a content suction part 400 through the content inflow hole 410. Thus, the contents, flowing through the content inflow hole 410 by a sealing member 430 installed at the content suction part 400, is sucked exclusively into the interior of a spuit pipe 210. At this time, the guide protrusion 241 of the button part 240 is configured to be secured to a limiting protrusion 222 such that the button part 240 may not be pressurized to a downward direction.

As the above, in order to use contents in a state that the contents are sucked into the interior of the spuit pipe 210, the outer cap 230 should be rotated to the other direction to separate the spuit part 200 from the coupling part 310; that is, when the outer cap 230 is rotated to the other direction, a first the outer cap 230 is rotated independently, and when the guide protrusion 241 meets an inner wall of the guide part 221 disposed at an upper dead end of a descending guide face 221b, the inner cap 220 is rotated along with the outer cap 230 as the guide protrusion 241 pressurizes the guide part 221. Due to this, the inner cap 220 gets detached from a screw coupling with a coupling part 310, and thereby the spuit part 200 is separated from the coupling part 310.

As the above, while the spuit part 200 is separated from the coupling part 310, the guide protrusion 241 is released from the limiting protrusion 222. At this time, a check valve installed at a content suction part 400 prevents the contents sucked in an interior of the spuit pipe 210 from moving to the container body 100 in case a user accidentally presses the button part 240.

Meanwhile, when the button part 240 is pressurized in a state that the spuit part 200 is separated from the coupling part 310, a pressurizing protrusion of the button part 240 pressurizes a descending guide face 221b of the inner cap 220, and thereby the inner cap 220 is rotated, such that the guide protrusion 241 descends along the descending guide face 221b, causing the button part 240 to descend.

When the button part 240 descends, a flange tip 243 coupled at a lower portion thereof descends together, such that the contents sucked in the content suction tube 330 comes to be discharged.

When the contents are discharged through the process above, the guide protrusion 241 gets secured to a securing face 221c. At this state, when the outer cap 230 is rotated to one side direction and the inner cap 220 is coupled to the coupling part 310, the guide protrusion 241 moves upwards along the ascending guide face 221a and causes the button part 240 to ascend, such that the contents is automatically withdrawn into the interior of the spuit pipe 210.

In other words, it is possible to withdraw contents to the interior of the spuit pipe 210 to use the contents in the next step by simply screw-coupling the inner cap 220 to the coupling part 310 through rotation of the outer cap 230.

Hereinafter, referring FIG. 10. FIG. 5, a fixed quantity discharge device for a liquid container according to another exemplary embodiment of the present invention will be described in detail.

Figure 10:
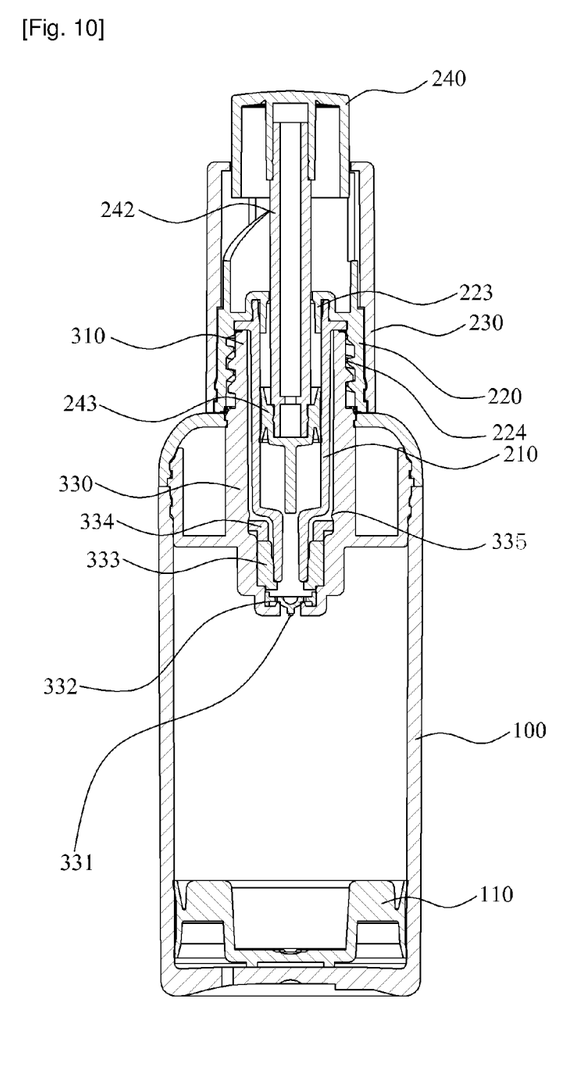
FIG. 10 is an assembled cross-sectional view illustrating a configuration of a fixed quantity discharge device for a liquid container according to another exemplary embodiment of the present invention.

Referring FIG. 10, a support body 300 of a fixed quantity discharge device for a liquid container according to another exemplary embodiment of the present invention is characterized to extend into the interior of the container body 100 such that the spuit pipe 210 can be inserted/withdrawn, and further to include a content suction tube 330 which forms a content inflow hole 331 at a lower end thereof such that contents may flow when the contents received in the container body 100 is sucked by means of a spuit part.

At an inner lower portion of the content suction tube 330 is provided a check valve 332 which opens/closes the content inflow hole 331 according to the change of pressure of the interior of the spuit pipe 210, and the structure and function thereof is the same as the check valve 332 previously described in an exemplary embodiment of the present invention. Thus detailed explanation will be omitted.

Meanwhile, at the inner lower end of the content suction tube 330 is provided a sealing member 333 which guides the contents flowing in through the content inflow hole 331 to move exclusively into the spuit pipe 210, wherein at an inner side of the content suction tube 330 is preferably installed a separation preventing member 334 which pressurizes an upper end of the sealing member 333 at an upper portion of the sealing member 333 and thereby prevents the sealing member 333 from being separated from the content suction tube 330.

Furthermore, at an inner side of the content suction tube 330 is provided a protrusion 335 which supports an upper end of the separation preventing member 334 and prohibits the separation preventing member 334 from moving in an upward direction.

The structure and function of the sealing member 333 is the same as the sealing member 430 which was previously described in an exemplary embodiment of the present invention. Thus detailed explanation will be omitted.

Meanwhile, the remaining structures and functions of the fixed quantity discharge device for a liquid container according to another exemplary embodiment of the present invention are the same as previously described in the exemplary embodiment of the present invention; thus, detailed explanation will be omitted.

As described above, optimal embodiments have been disclosed in the drawings and the specification. Although specific terms have been used herein, these are only intended to describe the present invention and are not intended to limit the meanings of the terms or to restrict the scope of the present invention as disclosed in the accompanying claims. Therefore, those skilled in the art will appreciate that various modifications and other equivalent embodiments are possible from the above embodiments. Therefore, the scope of the present invention should be defined by the technical spirit of the accompanying claims.

What is claimed is:

1. A fixed quantity discharge device comprising:
   a container body storing contents therein, and a spuit part coupled detachably from the container body and formed with a spuit pipe which sucks and then discharges a fixed quantity of contents stored in the content body,
   a support body coupled at an upper portion of the container body, equipped with a coupling part to which the spuit part is coupled, extending into the interior of the container body from the coupling part such that the spuit pipe can be inserted and withdrawn, and equipped at an inner lower end thereof with a content suction tube having a content inflow hole;
   a check valve installed at an inner side of the content suction tube and opening and closing the content inflow hole;
   a piston moving inside the container body as the spuit part sucks contents;
   a sealing member unattached from the check valve and installed with a close contact to the inner side of the content suction tube, and guiding the contents moving through the content inflow hole to move exclusively to an interior of the spuit pipe when the check valve opens; and a separation preventing member, disposed against the inner side of the content suction tube, pressurizing an upper end of the sealing member at an upper portion of the sealing member and preventing the sealing member from being separated from the content suction tube.

2. The fixed quantity discharge device for a liquid container of claim 1, comprising an insertion hole at an upper end of the sealing member such that the spuit pipe can be inserted/withdrawn, and a content moving hole at a lower end thereof such that the contents flowing in through the content inflow hole can move to the spuit pipe.

3. The fixed quantity discharge device for a liquid container of claim 1, wherein the check valve prevents the contents sucked into the spuit pipe from moving to the container body in a state that the spuit part is coupled to the coupling part, and prevents air inflow to the container body when the spuit part is separated from the coupling part.

4. The fixed quantity discharge device for a liquid container of claim 1, wherein the spuit part includes:
   the spuit pipe sucking the contents that is stored in the content suction tube and flows into a content suction tube through the content inflow hole;
   an inner cap screw-coupled to the coupling part and comprising a guide part which ascends/descends a button part at both upper ends thereof;
   an outer cap coupled encasing the inner cap and rotated along with the inner cap by a user's manipulation, and comprising a vertical guide groove longitudinally at an inner circumferential surface so as to guide a button part; and
   a button part ascending by a rotation of the outer cap and then descending by a user's pressurization, and comprising a guide protrusion which ascends/descends along the guide part of the inner cap.

5. The fixed quantity discharge device for a liquid container of claim 4, comprising a pipe fixing part, wherein an upper portion of the spuit pipe is screw-coupled at a center portion of the inner cap and fixes the spuit pipe to the inner cap.

6. The fixed quantity discharge device for a liquid container of claim 4, wherein the guide part is configured to include an ascending guide face which forms a slope in order to guide an ascent of a guide protrusion; a descending guide face which forms a slope so as to be corresponded with the ascending guide face and guides a descent of the guide protrusion; and a securing face which is disposed between the ascending guide face and the descending guide face and at which a guide protrusion arrives safely therein in a state that the guide protrusion is descended.

7. The fixed quantity discharge device for a liquid container of claim 6, comprising a limiting protrusion which extends horizontally at a dead-end of the ascending guide face, supports the guide protrusion, and limits a downward movement of the button part.

8. The fixed quantity discharge device for a liquid container of claim 4, wherein a flange tip supporting rod is protrusively formed in a downward direction at a center portion of an upper end of the button part, wherein at the flange tip supporting rod is coupled a flange tip which moves upwards/downwards inside the spuit pipe and sucks or discharges contents by a pressure change in the spuit pipe.

* * * * *